United States Patent [19]
Florencio

[11] Patent Number: 5,933,195
[45] Date of Patent: Aug. 3, 1999

[54] METHOD AND APPARATUS MEMORY REQUIREMENTS FOR STORING REFERENCE FRAMES IN A VIDEO DECODER

[75] Inventor: Dinei A. F. Florencio, Plainsboro, N.J.

[73] Assignee: Sarnoff Corporation, Princeton, N.J.

[21] Appl. No.: 09/001,201

[22] Filed: Dec. 30, 1997

Related U.S. Application Data

[60] Provisional application No. 60/060,112, Sep. 26, 1997.

[51] Int. Cl.[6] .................................................. H04N 7/50
[52] U.S. Cl. ........................... 348/416; 348/402; 348/424
[58] Field of Search ..................................... 348/390, 402, 348/415, 416, 424, 716

[56] References Cited

U.S. PATENT DOCUMENTS

| | | | |
|---|---|---|---|
| 5,262,854 | 11/1993 | Ng ............................................ | 348/416 |
| 5,581,302 | 12/1996 | Ran ........................................... | 348/416 |
| 5,635,985 | 6/1997 | Boyce ...................................... | 348/424 |
| 5,777,677 | 7/1998 | Linzer ...................................... | 348/415 |

*Primary Examiner*—Howard Britton
*Attorney, Agent, or Firm*—William J. Burke

[57] ABSTRACT

A method and apparatus that compresses reference frame information to efficiently utilize memory within a video decoder. Specifically, the present invention stores one or more reference frames in a compressed format, then recalls and decompresses portions of the frames as needed to decode predicted frames within a received bitstream containing video information.

9 Claims, 3 Drawing Sheets

METHOD AND APPARATUS MEMORY REQUIREMENTS FOR STORING REFERENCE FRAMES IN A VIDEO DECODER

This application claims the benefit of U.S. provisional application Ser. No. 60/060,112, filed Sep. 26, 1997, which is incorporated herein by reference.

The invention relates to a predictive video decoder and, more particularly, to a method and apparatus for efficiently storing reference frames in a predictive video decoder.

BACKGROUND OF THE DISCLOSURE

With the advent of digital video decoders being widely used in both consumer electronics and personal computers, these decoders must be fabricated in an inexpensive manner. Within predictive video decoders such as MPEG (Moving Pictures Experts Group) compliant decoders certain frames within the video sequence must be stored as reference frames since they are used to decode other frames within the video sequence. To store such reference frames, in MPEG terminology these frames are known as I and P frames, substantial amounts of memory are required to support the decoder functions. Presently MPEG decoders merely store an entire frame of decompressed pixelated video information as the reference images. These frames are subsequently used to decompress and predict other frames, e.g., so-called B frames, within the video sequence. Reducing the amount of memory required for storing such reference images would substantially reduce the overall cost of an MPEG decoder.

Therefore, a need exists in the art for a method and apparatus to efficiently accomplish reference frame storage.

SUMMARY OF THE INVENTION

The disadvantages associated with the prior art are overcome by the present invention of a method and apparatus that compresses reference frame information to efficiently utilize memory within a block-based video decoder. Specifically, the present invention stores one or more reference frames in a compressed format, then recalls and decompresses portions of the frames as needed to decode predicted frames within a received bitstream. At any point in time, under the MPEG standard, there are two reference frames that must be stored for use by the MPEG decoder. One of the frames (reference A) is used for producing a future reference frame, e.g., an I frame is used to predict a P frame and a P frame is used for producing another P frame. The other reference frame (Reference B) is not used for producing a future reference frame but is only used for producing one or more predicted frames, e.g., B frames. To insure an insignificant amount of distortion is produced within the decoded imagery, a lossless or high quality compression technique should be used when compressing Reference A frames, while Reference B frames can be compressed using either a lossy or lossless compression technique. A lossy compression technique may be used for compressing the Reference B frames because those frames are not used to predict reference frames and, as such, any errors generated in the decoded images are not accumulated. Note that in an MPEG-type system, where a previously decoded reference frame is used to predict the next reference frame as well as predicted frames, the invention decodes and stores the Reference A frame until it is used to decode another reference frame. Once the new reference frame is decoded, the new reference frame is deemed a Reference A frame and the previous reference A frame is renamed a Reference B frame. Additionally, upon renaming the Reference B frame can be further compressed (using lossy compression, if desired) since it is no longer used to predict a reference frame. The invention decodes and replaces the Reference B frame every time a new reference frame is decoded.

To implement the invention, additional circuitry is added to a conventional block-based video decoder. A conventional block-based video decoder contains a variable length decoder, an inverse quantizer, an inverse DCT unit, a summer, a video display memory, reference frame memory, and a motion compensation processor. The invention adds at least one compressor/decompressor as an input/output device coupled to the reference frame memory. If two reference frames are stored using different compression techniques, then one or two compressor/decompressors are used. Generally, the conventional decoder components operate as usual except that, as a reference frame is decoded, the frame is compressed within the compressor prior to storage in the reference frame memory. Thereafter, whenever a specific portion of the reference frame is needed for decoding another image, the portion is non-destructively recalled from memory, decompressed and coupled to the motion compensation processor for use in decoding images. By using this invention, a substantial amount of memory is saved for use by other processes or can be removed from the decoder all together.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
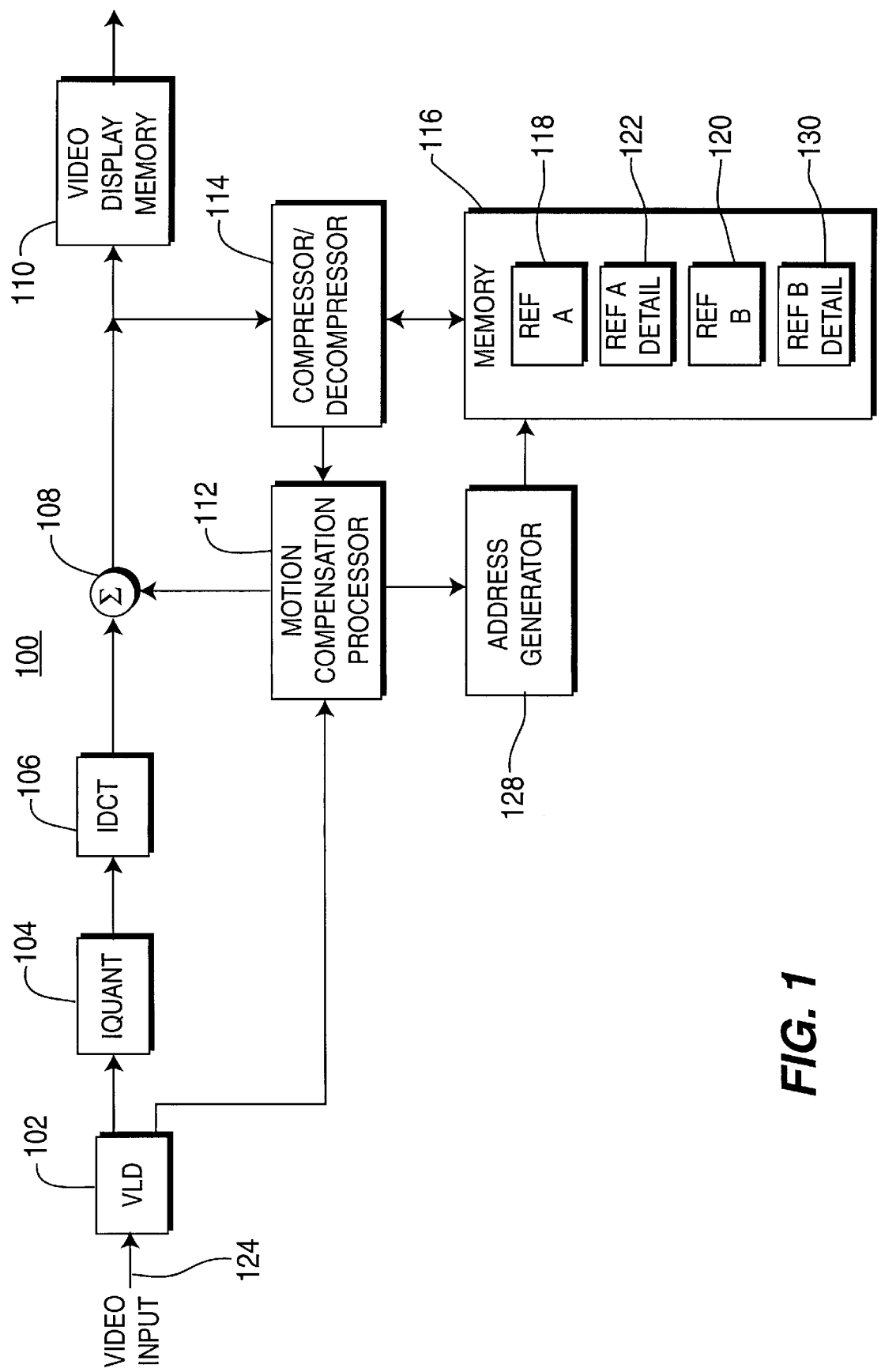
FIG. 1 depicts a block-based video decoder incorporating the present invention.

FIG. 1 depicts and illustration of an exemplary video decoder 100 arranged to process video data that is arranged in an MPEG-like format. This decoder 100 is similar to a wide variety of known motion compensated predictive video decoders (block-based video decoders) and thus a detailed description regarding the conventional components of the decoder will not be provided herein.

A block-based encoded video signal (an MPEG compliant signal) is provided along a path 124 to the variable length decoder 102. The variable length decoder (VLD)102 performs variable length decoding as its main function, but also provides ancillary processing such as zigzag inverse processing, removes header information and other control data from the video stream, and extracts motion vector information that is coupled to a motion compensation processor 112. The VLD 102 also produces a plurality of blocks of quantized DCT data which is applied to inverse quantizer 104. The inverse quantized information is then applied to an inverse DCT unit 106. The IDCT unit 106 is responsive to the blocks of coefficients produced by the inverse quantizer and generates matrices (e.g., 8×8 arrays) of pixel information. The arrays are coupled, in predetermined order, to an adder 108. A second input to the adder 108 is supplied with motion compensated image information as described below. Output data from the adder 108 corresponds to decompressed, motion compensated pixel values. These values are input to a video display memory (VRAM) 110 where the pixels are accumulated until an entire frame of image information is assembled. Subsequently, the video signals that are accumulated within the video display RAM are ultimately applied to a display device, e.g., television screen or computer display.

Output signals from the VLD 102 are also applied to a motion compensation processor 112 produces motion compensated blocks of video that are applied to the second input of the adder 108. To facilitate motion compensation, the reference frames (also known as anchor frames) within the video sequence must be stored to be used to motion compensate the various frames that are predicted within the video stream. Within an MPEG compliant stream, reference frames are interspersed with frames that are predicted from the reference frames, e.g., I and P frames are interspersed amongst B frames. As such, I and P frames must be stored as reference frames to facilitate decoding of the B frames. In addition, I frames and P frames are used to facilitate the decoding of P frames.

The present invention utilizes a compressor/decompressor 114 as an input/output device for the reference frame memory 120. As such, reference frames must be compressed to be stored and portions of the compressed reference frame must be decompressed when used by the motion compensation processor 112 for prediction of other frames. Generally, an MPEG compliant decoder requires storing two reference frames at a time. Thus, the present invention uses a compressor/decompressor to compress and decompress a pair of reference frames.

Specifically, the decoder 100 contains a frame compressor/decompressor 114 as well as two frame buffers (frame memory 116) for temporarily storing the reference frames 118 and 120. The compressor/decompressor 114 is coupled to the output of adder 108. The compressor/decompressor 114 is coupled to reference memory 116 as well as to the motion compensation processor 112

Figure 2:
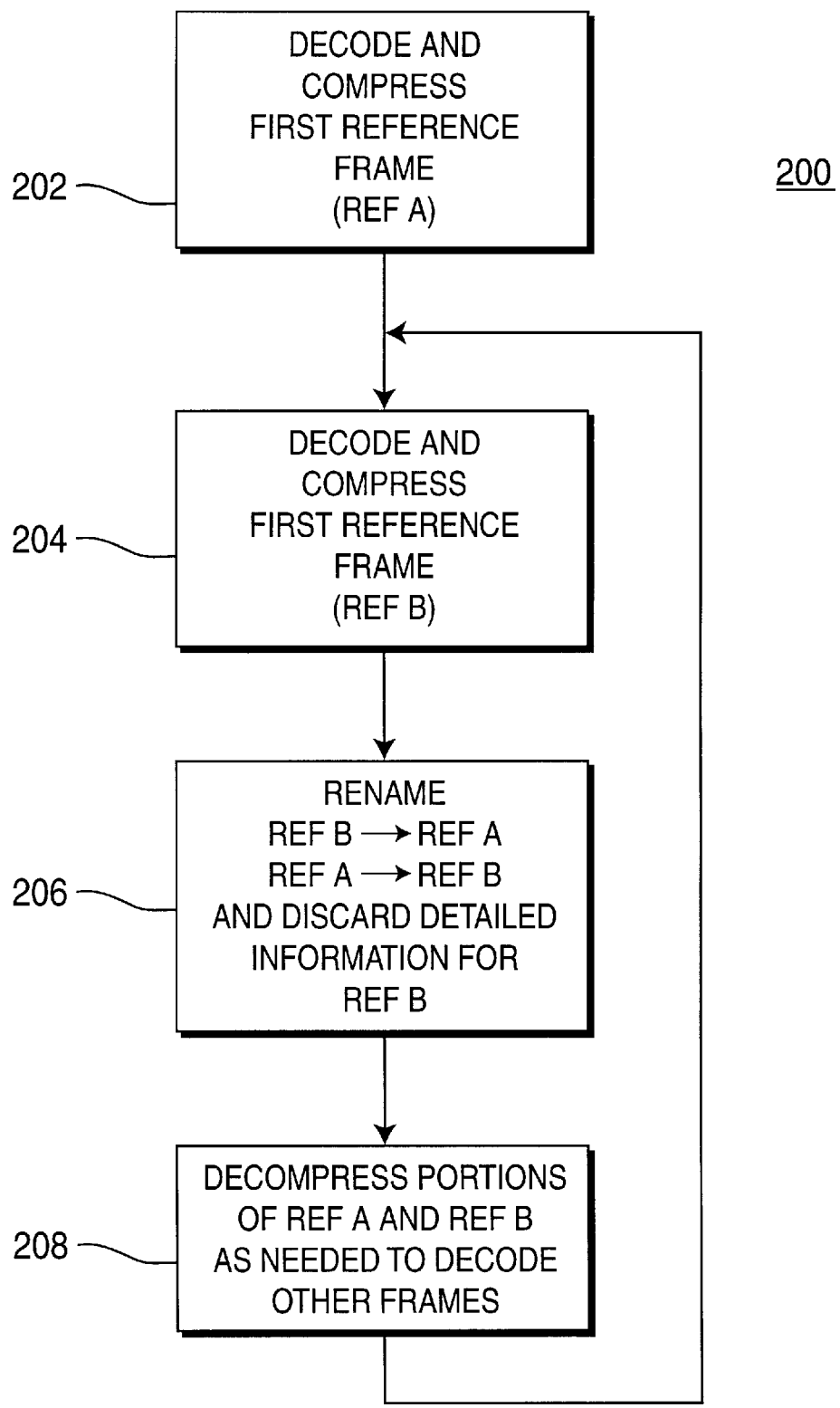
FIG. 2 depicts a flow diagram representing the operation of the present invention.

The invention uses a single compressor/decompressor 114 to process a Reference A frame and store all frame information very accurately, e.g., using a highly accurate, lossless compression technique. However, when a new reference frame is decoded and Reference A frame is renamed as a Reference B frame, the memory space used to store detailed information 122 about the image in the reference frame, e.g., high frequency pixel data, can be ignored such that those memory location for detailed information can be used to store other information. This produces de facto lossy compression for the Reference B frame. Consequently, less overall memory is used to store two frames of reference imagery and the loss of the detailed information does not substantially impact the decoding of predicted frames such as B-frames in an MPEG compliant bitstream. An address generator 128 provides the addresses for recalling the appropriate portions of the compressed frames for decompression. As such, this generator, in effect, renames the reference frames by recalling the appropriate information when needed. Although FIG. 1 depicts a single reference memory, a pair of memories may be used as separate frame buffers. Additionally, although a single compressor/decompressor is shown and described, a pair of compressor/decompressors may be used to separately handle compression and decompression of each reference image. Such individual compressor/decompressors would enable the decoder to utilize different compression techniques for compressing each type of reference frame. As such, to rename the reference frames and use a lossy compression technique for Reference B, Reference A would be recalled, decompressed and then recompressed using a lossy compression technique. The recompressed Reference A (old reference) would be stored as Reference B. FIG. 2 depicts a flow diagram 200 of the process of the present invention for decoding and compressing reference images to facilitate efficient memory utilization for the decoder 100 of FIG. 1. To best understand the operation of the present invention, an overview of the contents of an MPEG-like bitstream is presented. In general, in an MPEG-like bitstream, data representing the first anchor frame within a Group of Pictures (GOP) is intraframe encoded, and data representing the remaining frames is interframe encoded. The data representing intraframe encoded frames is generated by segmenting the pixel representing an image frame into respective 8×8 blocks and performing a discrete cosine transform (DCT) on the pixel data in each block. No motion vectors are generated for the first intraframe encoded frame, i.e., the intraframe information is not motion compensated in an I frame.

Alternatively, data representing interframe encoded frames is generated by predicting image frames from preceding frames, following frames, or both; determining the differences between the predicted and actual frames; and performing the DCT on 8×8 blocks of residual data. The interframe DCT coefficients represent frame difference data. Motion vectors, for interframe encoded frames are code words which identify groups of 8×8 blocks of pixels in frames from which predictive frames are generated, which blocks must closely match the block currently being processed in the frame currently being encoded.

Generally the first frame in a GOP that can be decoded is an intraframe encoded frame (I frame) which is not motion compensated and as such the motion compensation processor applies zeros to the second input of the adder 108 of FIG. 1. Consequently, in step 202, the I frame data is decoded and applied to the input of the compressor/decompressor 114. As such, the I frame is compressed and stored in reference memory 120 as Reference A (i.e., the newest reference frame). At step 204, the next reference frame, an interframe encoded frame (P frame)that follows the I frame is decoded and compressed to form a second reference (for now Reference B). Since the second reference frame (P frame) is now the newest reference frame, at step 206, the first reference frame is renamed Reference B and the newest reference frame is Reference A. As such, using this routine, the newest reference frame that is decoded is always Reference A. Additionally, if additional memory is to be saved, the detailed information 122 that is stored when the new reference frame is decoded can be deleted or used for storing other information when the reference frame is renamed. That detailed information is not needed to decode other predicted frames, i.e., such detailed information is not necessary for decoding B frames of an MPEG compliant bitstream. Alternatively, if two compression techniques are used, at the renaming step 206, the old reference frame can be recompressed and stored as Reference B.

Using these two reference frames, at step 208, the remaining data within the video stream that lies between the intraframe encoded frames is decoded. As such all of the interframe encoded frames (B frames) are decoded using the two reference frames. To facilitate decoding, the appropriate portion of a reference frame for the interframe encoded frame then being decoded is non-destructively recalled from frame memory and decompressed for use in motion compensation.

When the next reference frame arrives, the routine 200 returns to step 204 to decode and compress that reference frame. It becomes the new reference frame such that the previously decoded frame becomes Reference B and the newly decoded reference frame becomes Reference A. Thereafter, these two frames are used to decode predicted frames and so on until the entire GOP is decoded. When each new I frame is identified, the routine 200 begins at step 202.

Various forms of compression and decompression can be used in conjunction with the present invention. However, it should be noted that the technique must be amenable to random access within the memory of regions of the reference frames. In an MPEG compliant system, random access of 16×16 pixel blocks (or 17×17 pixel blocks, if half-pel interpolation is used) must be available. To facilitate such access and decompression of regions of the reference image, the reference image can be divided into regions, e.g., 16×16 blocks, and independently compressed region by region. The compression technique for each region can be either fixed length or variable length. A variable length coding technique is more efficient in terms of compression, the use of a fixed length coding technique is more amenable to a pointer system to facilitate random access of the regions. To further enhance compression, the regional compression could be made dependent upon neighboring regions; however, the additional compression efficiency is then traded against increased coding complexity.

Figure 3:
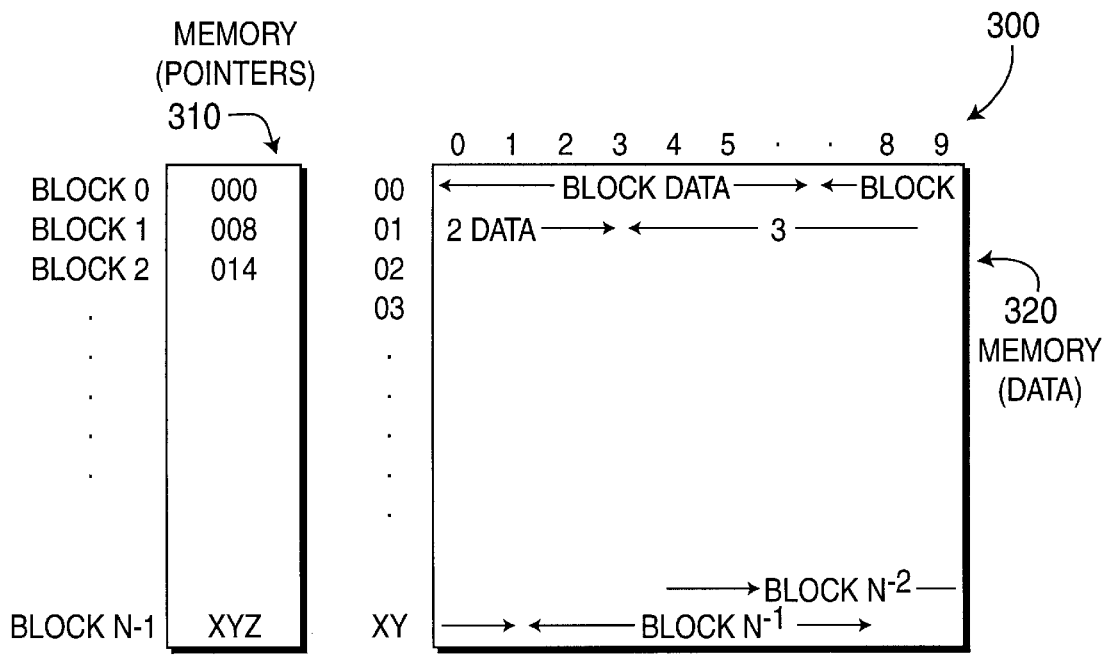
FIG. 3 depicts a memory structure used by the invention when a variable length coding technique is used to compress a reference image.

FIG. 3 depicts a memory structure 300 for a variable length encoded reference frame comprising a memory data space 320 and a pointer data space 310. To use a variable length coding technique, the regions of the reference image have been variable length encoded and stored in the memory space 320 as segments of data, e.g., block 0 data, block 1 data, and so on to block N-1 data. Since these segments vary in length depending upon the content of the portion of the reference frame that they represent, the segments do not begin or end at any fixed memory location. As such, to facilitate retrieval of the regions for decompression and motion compensation, a number of pointers are needed that identify the storage locations of each segment. As such, when a particular region is required, the memory address generator will first address the pointer memory space 310 to retrieve a pointer that identifies the address of the region corresponding to the desired region. As such, the pointer memory space maps the regions to region locations within the memory space 320. Variable length coding techniques include wavelet-based, DCT-based, morphological coders, a standard single frame image compression technique such as JPEG, and the like. If a certain memory size limit is required, then a bit utilization control unit (bitrate controller) may be used to ensure that the number of bits used by the compression technique is within a bit budget defined by the memory.

Figure 4:
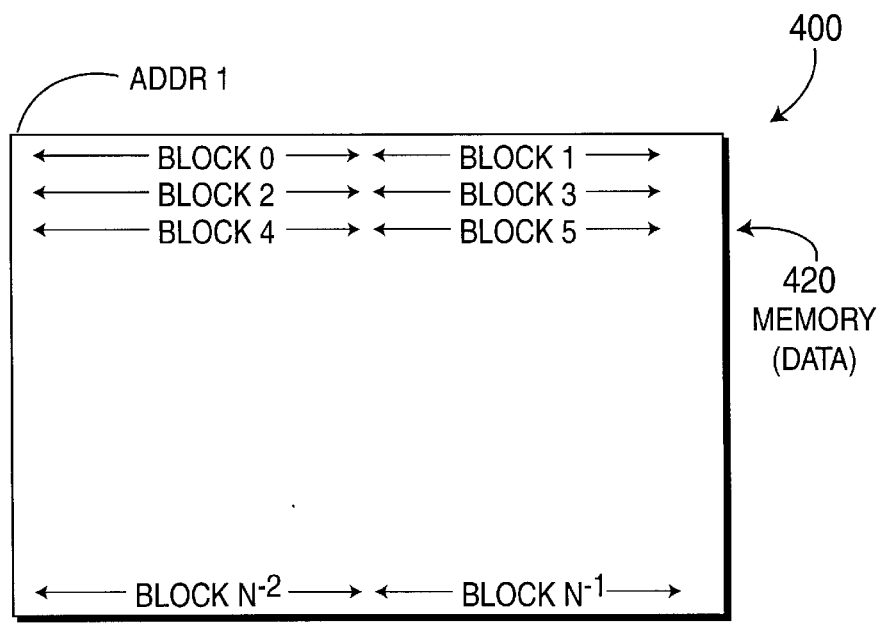
FIG. 4 depicts a memory structure used by the invention when a fixed length coding technique is used to compress a reference image.

FIG. 4 depicts a memory structure 400 for a fixed length encoded reference frame comprising a memory data space 420. To use a fixed length coding technique, the regions of the reference image have been fixed length encoded and stored in the memory space 320 as segments of data, e.g., block 0 data, bloock 1 data, and so on to block N-1 data. Since these segments fixed in length, the segments begin and end at fixed memory locations relative to the first memory location (ADDR 1). As such, to facilitate retrieval of the regions for decompression and motion compensation, the memory address generator can merely address the known location of a particular segment of data without using a pointer memory. The particular address is computed by multiplying a region number (X) by the number of bytes in a segment (K) added to ADDR 1. Mathematically, the desired address is K*X+ADDR 1. As such, when a particular region is required, the memory address generator computes the address and directly addresses the segment of the desired region.

The memory structure of FIG. 4 may be used to store variable length coded reference frames by truncating the higher order bits of the encoded frame such that the encoded segments fit within the fixed length memory locations. The truncated information may be stored separately as the "detailed information" discussed above that is used to decode a new reference frame and deleted upon converting a reference frame from Reference A to Reference B.

As a simple example of a fixed length compression technique that can be used to compress the reference frames, a group of decoded samples are arranged in 2×2 blocks identified as blocks X-1, X-2, X-3 and X-4. Block X-1 is coded with full precision, e.g., 8 bits, while the other images are coded as differences. As such, image X-2 minus X-1 is coded, X-3 minus X-1 is coded, and X-4 minus X-1 is coded using a logarithmic quantizer with 4 bits. Using this simple compression scheme, the memory savings is as much as 37% over that of storing full precision blocks. This technique introduces little distortion and provides a pre-defined addressing technique due to the constant length code words.

Although various embodiments which incorporate the teachings of the present invention have been shown and described in detail herein, those skilled in the art can readily devise many other varied embodiments that still incorporate these teachings.

What is claimed is:

1. In a block-based video decoder, a method of utilizing reference frames contained in a bitstream of encoded video information comprising the steps of:
   (a) decoding and compressing a first reference frame;
   (b) decoding and compressing a second reference frame;
   (c) selectively decompressing portions of either said first or second reference frames to decode other frames in said bitstream;
   (d) upon decoding each new reference frame from said bitstream, replacing an oldest reference frame of said first and second reference frames with said new reference frame and deleting some information stored as part of a remaining reference frame; and
   (e) repeating steps (c) and (d).

2. The method of claim 1 wherein said some information is detailed information within the remaining reference frame.

3. The method of claim 2 wherein the compressing steps further comprises the steps of:
   dividing a reference image into regions;
   compressing each region separately; and storing said compressed regions.

4. The method of claim 3 further comprising the step of:
compressing each region with a fixed length encoding technique.

5. The method of claim 3 further comprising the step of:
compressing each region with a variable length coding technique.

6. The method of claim 5 further comprising the step of:
storing a plurality of pointers to identify the storage locations of segments representing compressed regions.

7. The method of claim 5 wherein said variable length encoded regions are stored as segments within a fixed length amount of memory.

8. The method of claim 5 wherein any portion of the segment that exceeds the fixed length amount of memory is truncated.

9. The method of claim 5 wherein any portion of the segment that exceeds the fixed length amount of memory is stored in a separate memory space.

* * * * *